Patented Mar. 20, 1951

2,545,538

UNITED STATES PATENT OFFICE 2,545,538

PROCESS FOR MANUFACTURE OF NITRIC ESTERS OF NORMALLY SOLID PRIMARY ALCOHOLS

Robert Eugene Barnhart, Gibbstown, and Robert Morris Cavanaugh, Woodbury, N. J., assignors to E. I. du Pont de Nemours & Company, Wilmington, Del., a corporation of Delaware No Drawing. Application December 11, 1947, Serial No. 791,174

8 Claims. (Cl. 260—467)

This invention relates to a novel process for the manufacture of nitric acid esters of normally solid primary alcohols.

Nitric esters of primary alcohols have long been important products in chemical industry, and the methods employed in their manufacture have become standardized and in many ways very efficient. Nitroglycerin and nitrocellulose, for example, have been in large scale production for many years, though the common names given above are misnomers, as nitroglycerin and nitrocellulose are actually nitric esters rather than nitrocompounds. Other explosive compounds of this group that have been in plant production are ethylene glycol dinitrate, pentaerythritol tetranitrate, mannitol hexanitrate, etc.

The methods used for manufacturing the above nitric esters have comprised esterifying the alcohol by means of nitric acid, either by itself in concentrated form or in mixture with sulfuric acid, as the well-known mixed acids. Such methods for the most part have proved generally satisfactory for the nitric esters in large scale production. In certain cases, however, it has been impossible to obtain a product, by their use, of the desired degree of stability.

An object of the present invention is a new and improved method for the manufacture of nitric esters of normally solid primary alcohols. A further object is a method whereby accurate control of the esterification reaction is achieved and a product of superior stability is obtained. A still further object is a method by which a more uniform feeding procedure for the solid material to be treated is obtained and complete esterification throughout the solid particles is assured. Additional objects will be disclosed as the invention is described more at length in the following.

We have found that the foregoing objects are accomplished when we prepare the esters of the alcohols by effecting the reaction of a crystalline, normally solid primary alcohol with high strength nitric acid in the presence of acetic anhydride. Desirably we make certain that esterification takes place throughout the particles of solid material and that no incompletely reacted alcohol remains by dissolving the material to be esterified in a solvent that is reactively inert under the conditions of the procedure. Glacial acetic acid is the preferred solvent for such use. This solution and high strength nitric acid, for example of 98% strength, are then fed simultaneously into acetic anhydride, where reaction takes place. While the invention is applicable to various esterifications of normally solid primary alcohols, we find it very advantageous, for example, in preparing the trinitrate of methyltrimethylolmethane.

The invention will be shown more clearly by the following specific example describing an exact method of procedure followed in one particular embodiment. It will be understood, of course, that this is by way of illustration only and is not to be taken as limiting in any way.

Methyltrimethylolmethane in the amount of 5 lb. 12 oz. and of a granulation such that it passed a 20 mesh screen, was dissolved in 12 lb. 2 oz. of glacial acetic acid at 35° C. After solution was complete, it was cooled to about 25° C. Acetic anhydride of 95% strength and in the amount of 20 lb. 3 oz. was then introduced into a vessel adapted for nitration or nitric esterification and fitted with agitation and temperature control means. The previously prepared solution of methyltrimethylolmethane in glacial acetic acid and 11 lb. 2 oz. of 98% nitric acid were then fed simultaneously into the acetic anhydride at such a rate that by means of brine coils the mixture was held at a temperature between 20° and 26° C. The ratios of nitric acid and methyltrimethylolmethane employed and the rate of feeding were such that a substantially constant excess of nitric acid of about 20% over the alcohol was maintained throughout the feeding period. The mixture was held at reaction temperature for an additional 30 min. following the feeding. The nitration mixture was then cooled to 10° C. and drowned in cold water with air agitation. After settling for 15 min., the liquid methyltrimethylolmethane trinitrate was drawn off at the bottom of the reactor, washed with water at 38° C., separated, and washed again, first with warm water then with ammonia water. The trinitrate of methyltrimethylolmethane was obtained in the amount of 11 lb., comprising a yield of 90% of theory. The product showed no initial acidity and was satisfactory with respect to stability on storage.

In comparison with the product obtained by the foregoing procedure, the same compound was prepared by nitration (1) by means of 98% nitric acid, and (2) by mixed acid ($H_2SO_4+HNO_3$). By both of these latter methods, the product obtained was of quite unstable characteristics, as shown when left in contact with the residual spent acid for short periods of time.

The foregoing example has described the nitration of methyltrimethylolmethane by a method involving the use of acetic anhydride. While the method is very advantageous for this compound, it may be applied effectively also with other normally solid primary alcohols, for example pentaerythritol, erythritol, mannitol, sorbitol, nitrosobutylglycerol, and the like. In speaking of solid alcohols, we intend to designate those compounds that are definitely solid at ordinary temperatures and not so close to their fusion points as to be difficultly handled at temperatures above their melting points, in other words alcohols that have fusion points above 30° C.

In the nitration of such solid alcohols, we find it advantageous to facilitate gradual feeding by first dissolving the alcohol in a solvent that is reactively inert under the conditions prevailing. The simultaneous introduction of this solution and of concentrated nitric acid into a body of acetic anhydride allows better control of the reaction than if the solid material were fed in, regardless of the fineness of the grains. At the same time, the introduction of the alcohol in the form of a solution assured uniform and complete esterification of all the alcohol groups, which would not be the case with introduction of the alcohol in solid form. A high degree of chemical stability for the product results from such a feeding procedure. In preparing a solution of the solid alcohol prior to nitration, a solvent must be used that is miscible with water and nitric acid, and desirably with acetic anhydride, and that at the same time is reactively inert under the conditions prevailing, i. e. chemically compatible with the reactants. Glacial acetic acid is the preferred solvent for use since it answers the above requirements, and particularly because it introduces no additional residual product. Other solvents may be used, however, such as propionic acid, butyric acid, and the like.

Nitric acid of high strength should be used, desirably above 95% concentration, and 98% $HNO_3$ is particularly suitable. It has been found advantageous to have nitric acid present in excess over the alcohol; consequently a constant excess is maintained throughout the feeding, desirably around 15%. In the preparation of methyltrimethylolmethane trinitrate, a suitable reaction temperature is between 10° and 95° C., preferably between 20° and 40° C. Whether liquid or solid, the nitration reaction mixture is drowned in cold water and the ester washed sufficiently to remove the last traces of acidity before the product goes to storage.

While the invention has been described adequately in the foregoing, it will be understood that many deviations in reactants, procedures and the like may be introduced, without departure from the scope of the invention. We intend to be limited, therefore, only by the following claims.

We claim:

1. A process for the manufacture of nitric acid esters which comprises dissolving a normally solid, crystalline polyhydric alkanol containing at least two of the hydroxyl groups in a primary alcohol structure in a solvent that is reactively inert under the conditions prevailing, simultaneously feeding the solution of the alcohol and high strength nitric acid into acetic anhydride.

2. A process for the manufacture of nitric acid esters which comprises dissolving a normally solid, crystalline polyhydric alkanol containing at least two of the hydroxyl groups in a primary alcohol structure in glacial acetic acid, and simultaneously feeding the acetic acid solution and high strength nitric acid into acetic anhydride.

3. The process of claim 2, in which the solid polyhydric alkanol is pentaerythritol.

4. The process of claim 2, in which the solid polyhydric alkanol is mannitol.

5. The process of claim 2, in which the solid polyhydric alkanol is methyltrimethylolmethane.

6. The process of manufacturing methyltrimethylolmethane trinitrate which comprises dissolving methyltrimethylolmethane in glacial acetic acid, simultaneously feeding the acetic acid solution and high strength nitric acid into acetic anhydride, maintaining a reaction temperature between 10° and 75° C. and a slight excess of nitric acid during the feeding period, and drowning and separating the methyltrimethylolmethane trinitrate from the acid solution.

7. The process of claim 2, wherein the solid polyhydric alkanol is erythritol.

8. The process of claim 2, wherein the solid polyhydric alkanol is sorbitol.

ROBERT EUGENE BARNHART.
ROBERT MORRIS CAVANAUGH.

REFERENCES CITED

The following references are of record in the file of this patent:

UNITED STATES PATENTS

| Number | Name | Date |
|---|---|---|
| 1,938,176 | Dreyfus | Dec. 5, 1933 |
| 2,125,880 | Berl | Aug. 9, 1938 |
| 2,195,551 | Wyler | Apr. 2, 1940 |
| 2,301,231 | Spaeth | Nov. 10, 1942 |
| 2,396,330 | Lufkin | Mar. 12, 1946 |
| 2,400,287 | Caesar | May 14, 1946 |
| 2,432,280 | Caesar | Dec. 9, 1947 |